United States Patent
Matsumoto

(10) Patent No.: US 7,725,120 B2
(45) Date of Patent: May 25, 2010

(54) MOBILE STATION IN WIRELESS COMMUNICATION SYSTEM AND METHOD OF CONTROLLING SIGNAL-TRANSMISSION POWER IN WIRELESS COMMUNICATION SYSTEM

(75) Inventor: Tatsuki Matsumoto, Tokyo (JP)

(73) Assignee: NEC Corporation, Tokyo (JP)

( * ) Notice: Subject to any disclaimer, the term of this patent is extended or adjusted under 35 U.S.C. 154(b) by 1131 days.

(21) Appl. No.: 11/316,903

(22) Filed: Dec. 27, 2005

(65) Prior Publication Data
US 2006/0142043 A1 Jun. 29, 2006

(30) Foreign Application Priority Data
Dec. 28, 2004 (JP) ............................. 2004-379119

(51) Int. Cl.
H04B 7/00 (2006.01)
(52) U.S. Cl. ...................... 455/522; 455/442; 455/436; 455/69; 455/13.4
(58) Field of Classification Search ................. 455/522, 455/572, 70, 436, 63.1, 114.2, 69; 370/331, 370/249
See application file for complete search history.

(56) References Cited

U.S. PATENT DOCUMENTS

| 5,551,057 | A  | * | 8/1996  | Mitra ........................... 455/522 |
| 6,097,972 | A  | * | 8/2000  | Saints et al. ................. 455/572 |
| 6,334,047 | B1 | * | 12/2001 | Andersson et al. ............ 455/69 |
| 6,434,367 | B1 | * | 8/2002  | Kumar et al. .................. 455/70 |
| 7,295,855 | B1 | * | 11/2007 | Larsson et al. ............... 455/522 |
| 2002/0027891 | A1 | * | 3/2002 | Mimura ....................... 370/331 |
| 2003/0123425 | A1 | * | 7/2003 | Walton et al. ................ 370/341 |
| 2003/0152135 | A1 | * | 8/2003 | Cramer, III ................. 375/140 |
| 2004/0106426 | A1 | * | 6/2004 | Koo et al. .................... 455/522 |
| 2004/0176126 | A1 | * | 9/2004 | Sato et al. ................... 455/522 |
| 2004/0233871 | A1 | * | 11/2004 | Seki et al. ................... 370/331 |
| 2004/0235510 | A1 | * | 11/2004 | Elicegui et al. ............. 455/522 |
| 2005/0201281 | A1 | * | 9/2005 | Damnjanovic et al. ....... 370/230 |
| 2005/0213636 | A1 | * | 9/2005 | Zeira et al. .................. 375/130 |
| 2006/0058054 | A1 | * | 3/2006 | Hiramatsu ................... 455/522 |
| 2008/0014978 | A1 | * | 1/2008 | Kaneko et al. .............. 455/522 |

(Continued)

FOREIGN PATENT DOCUMENTS

JP 2001-211119 A 8/2001

(Continued)

OTHER PUBLICATIONS

"3GPP TS 25.214 V3. 12. 0", pp. 11-21, Apr. 4, 2003, 3GPP (printed on Jul. 7, 2004 through Internet from the site having URl http://www.3gpp.org/ftp/Specs/ html-info/25214.htm).

(Continued)

Primary Examiner—Tan Trinh
(74) Attorney, Agent, or Firm—Sughrue Mion, PLLC

(57) ABSTRACT

A mobile station in a CDMA wireless communication system, includes a receiver which receives power-control data by which power for transmitting a wireless signal is controlled, from a plurality of base stations during soft handover, a judging unit which judges tendency in accordance with which the power-control data varies, in accordance with predetermined standard, and a masking unit which masks the power-control data, based on the results transmitted from the judging unit.

25 Claims, 5 Drawing Sheets

U.S. PATENT DOCUMENTS

2008/0247358 A1* 10/2008 Damnjanovic et al. ...... 370/329

FOREIGN PATENT DOCUMENTS

| JP | 2002-217751 A | 8/2002 |
| JP | 2003-87184 A | 3/2003 |
| JP | 2003-204299 A | 7/2003 |
| JP | 2004-88333 A | 3/2004 |
| WO | WO 99/37111 A1 | 7/1999 |

OTHER PUBLICATIONS

"3GPP TS 25.214 V3. 12. 0", pp. 21-27, Apr. 4, 2003, 3GPP (printed on Jul. 7, 2004 through Internet from the site having URL http://www.3gpp.org/ftp/Specs/ html-info/25214.htm).

"Spectrum Spreading Technology", Kenichi Matuo, Tokyo Denki University Publishing section, May 30, 2002, pp. 230-231.

* cited by examiner

MOBILE STATION IN WIRELESS COMMUNICATION SYSTEM AND METHOD OF CONTROLLING SIGNAL-TRANSMISSION POWER IN WIRELESS COMMUNICATION SYSTEM

BACKGROUND OF THE INVENTION

1. Field of the Invention

The invention relates to a mobile station in a CDMA wireless communication system, a method of controlling power for transmitting a CDMA wireless signal in a wireless communication system, an apparatus for controlling power for transmitting a wireless signal in a CDMA wireless communication system, and a computer readable medium encoded with program for causing a computer to carry out a method of controlling power for transmitting a wireless signal in a CDMA wireless communication system. The invention relates more particularly to signal-transmission power control in a situation in which a mobile station makes communication with a plurality of base stations.

2. Description of the Related Art

A wireless communication terminal such as a mobile phone, PHS (personal handy phone system), PDA (personal digital assistant), a pager, and a device capable of making communication with a wireless LAN is now popularized, and further expansion of a service area and variation in services are expected.

Wireless communication technology may be grouped into TDMA (Time Division Multiple Access) and CDMA (Code Division Multiple Access), for instance. Hereinbelow is explained CDMA to which the present invention is preferably applied.

In a CDMA wireless communication system, communication is made as follows.

First, a transmitter spreads signals with pseudorandom noise (PN) codes of the transmitter, and then, transmits the signals.

On receipt of the signals from the transmitter, a receiver de-spreads the received signals with the same pseudorandom noise (PN) codes as those of the transmitter to reproduce the signals transmitted from the transmitter.

In CDMA, a plurality of transmitters uses pseudorandom noise (PN) codes perpendicular to and different from one another, and hence, it is possible to differentiate the transmitters from one another. Thus, a plurality of transmitters can transmit wireless signals having a common frequency.

However, it is quite difficult to render all pseudorandom noise (PN) codes perpendicular to one another. Actually, pseudorandom noise (PN) codes are not completely perpendicular to one another, that is, there exists correlation among pseudorandom noise (PN) codes. Such correlation interferes with communication, resulting in degradation in communication quality. Since correlation causes interference, as a number of transmitters increases, interference increases.

In a wireless communication system, communication is not made directly between mobile stations corresponding to wireless communication terminals, but made through a base station. Hence, there is caused a problem that signals transmitted from a mobile station located in the vicinity of a base station interfere with weak signals transmitted from a mobile station located far away from the base station. In a CDMA wireless communication system, in order to avoid degradation in communication quality caused by the above-mentioned problem, power by which a wireless signal is transmitted to a mobile station (hereinafter, referred to as "signal-transmission power") is controlled.

Hereinbelow is explained an example in which signal-transmission control is applied to W-CDMA (Wideband-CDMA) which is one of IMT-2000.

A base station controls signal-transmission power such that Eb/I0 (a ratio of desired power (Eb) for receiving a signal to power (I0) of an interference signal) obtained through communication channel established to each of mobile stations is kept equal to a predetermined Eb/I0 in order to ensure requisite communication quality. Specifically, a base station controls signal-transmission power as follows.

A base station periodically transmits a down-channel signal to a mobile station together with TPC (Transmission Power Control) data in accordance with which power by which a mobile station transmits a signal to a base station is increased or reduced.

If SIR (Signal to Interference Ratio) of a signal received from a mobile station is smaller than Eb/I0, a base station transmits TPC data to the mobile station to increase the power. In contrast, if SIR of a signal received from a mobile station is greater than Eb/I0, a base station transmits TPC data to the mobile station to reduce the power. Herein, SIR of a signal received from a mobile station is used as one of data indicative of wireless communication quality.

The mobile station controls the power by which an up-channel signal is transmitted to the base station, in accordance with the received TPC data.

The above-mentioned transmission power control is described in "3GPP TS 25.214 V3. 12. 0", pp. 11-21, Apr. 4, 2003, 3GPP (printed on Jul. 7, 2004 through Internet from the site having URL "http://www.3gpp.org/ftp/Specs/html-info/25214.htm).

Transmission power control is carried out to power for transmitting a signal through down-channel.

A mobile station transmits an upward signal to a base station together with TPC data in accordance with which power for transmitting a signal to the mobile station from the base station is increased or reduced. The base station controls power for transmitting a signal to the mobile station, in accordance with the TPC data received from the mobile station.

The above-mentioned transmission power control is described in "3GPP TS 25.214 V3. 12. 0", pp. 21-27, Apr. 4, 2003, 3GPP (printed on Jul. 7, 2004 through Internet from the site having URL "http://www.3gpp.org/ftp/Specs/html-info/25214.htm).

In a wireless communication system, in which each of base stations transmits signals having different frequencies from one another, it is necessary to switch a frequency each time of handover, and hence, communication is instantaneously interrupted. Herein, handover means a function of a mobile station for automatically switch a base station to continue communication, when the mobile station moves into a second service area of a second base station from a first service area of a first base station.

In contrast, since it is possible for base stations in a W-CDMA wireless communication system to use signals having a common frequency, it is not necessary for a mobile station to switch a current frequency to a frequency associated with each of base stations at handover. Accordingly, a W-CDMA wireless communication system allows a mobile station to carry out soft handover (SHO), that is, to carry out handover without instantaneous interruption of communication, as described in "Spectrum Spreading Technology", Kenichi MATUO, Tokyo Denki University Publishing section, May 30, 2002, pp. 230-231.

Herein, soft handover (SHO) is defined as handover to be carried out keeping a mobile station in communication with a plurality of adjacent base stations through the use of signals having a common frequency, and is inherent to a W-CDMA wireless communication system.

In a W-CDMA wireless communication system, power for transmitting upward and downward signals between a mobile station and a base station is controlled even during SHO. When power for transmitting a downward signal is to be controlled, a mobile station transmits common TPC data to a plurality of base stations with which the mobile station is in communication.

When power for transmitting an upward signal is to be controlled, a mobile station controls the power in accordance with a plurality of TPC data received from a plurality of base stations with which the mobile station is in communication. However, since a mobile station is usually designed to include a single signal-transmission circuit, it is necessary to unite a plurality of TPC data into single TPC data.

A plurality of TPC data can be degenerated into single TPC data in many ways. The standard specification defines Algorithm 1 and Algorithm 2 (see 3GPP TS 25.214 V3. 12. 0", p. 11-21).

In a system in which transmission power control is carried out between a plurality of base stations and a single mobile station, even if a part of the base stations transmits TPC data to the mobile station to increase power by which the mobile station transmits a signal, and the mobile station increases the power in response to the received TPC data, communication quality might not meet desired requirement.

Various reasons are considered to the above-mentioned problem. For instance, in an environment in which complicated phasing occurs, a bit error rate (BER) would not be improved, even if the power is increases, due to the phasing, resulting in that communication quality does not meet desired requirement. However, since a base station receives a signal which does not meet the required communication quality, the base station keeps transmitting TPC data to the mobile station to increase power by which the mobile station transmits a signal to the base station.

When a mobile station is located remarkably far away from a base station, the base station keeps transmitting TPC data to the mobile station to increase power by which the mobile station transmits a signal to the base station.

Furthermore, when a base station is out of order, the base station often keeps transmitting TPC data to the mobile station to increase power by which the mobile station transmits a signal to the base station.

If a certain base station keeps transmitting TPC data to a mobile station to increase power by which the mobile station transmits a signal to the base station, the power is increased excessively, and resultingly, the mobile station may transmit a signal to the base station with higher power than necessary.

If a certain base station transmits a signal with higher power than necessary, interference would be unpreferably increased to other base stations. Furthermore, increase in interference would cause reduction in communication channel capacity of a base station.

Transmission power control during SHO has been suggested as follows.

For instance, WO99/37111 has suggested transmission power control to be carried out to a mobile station during SHO in a CDMA wireless communication system, in order to optimally control power by which a mobile station transmits a signal during SHO. On receipt of various TPC data from a plurality of base stations during SHO, a mobile station calculates reliability data to apply weighting to TPC data in proportion to transmission power, but in inverse proportion to noise power, based on both signal power obtained by averaging the received TPC data with a predetermined time constant, and an average SIR in a recent period of time. The mobile station weights the received TPC data with the reliability data, and controls power by which a signal is transmitted to the base station, in accordance with the thus weighted TPC data.

Though the TPC data is averaged with a predetermined time constant, the transmission power control suggested in WO99/37111 is accompanied with a problem that it is not possible to avoid a mobile station from being influenced by a base station keeping transmitting TPC data to increase power by which the mobile station transmits a signal to the base station.

Japanese Patent Application Publication No. 2001-211119 has suggested transmission power control in a CDMA wireless communication system in order to reduce an error in transmission power control by varying a step size in accordance with which transmission power is controlled, when control delay exists. The transmission power control is carried out based on a known relation between statistical characteristics of TPC commands and an optimal step size. Specifically, an optical step size is determined statistically based on stored TPC commands.

However the suggested transmission power control is accompanied with a problem that it is not possible to avoid a mobile station from being influenced by a base station keeping transmitting TPC data to increase power by which the mobile station transmits a signal to the base station.

Japanese Patent Application Publication No. 2002-217751 has suggested a transmission power controller including a first unit which compensates for a symbol point of data in accordance with a corrected amplitude, and a second unit which, based on a first signal indicative of whether it is necessary to compensate for an amplitude of a symbol, and a second signal indicative of masking at least one of symbol point components, compensates for an amplitude of the symbol, and transmits the thus compensated amplitude to the first unit.

Japanese Patent Application Publication No. 2003-87184 has suggested a method of judging a condition of an electric field in a mobile station in a mobile communication system, including the steps of counting a number of TPC bits in a plurality of slots in a predetermined period of time, measuring an intensity of an electric field of a signal received from a base station, calculating TPC bit estimate, based on the number of TPC bits, calculating field intensity estimate, based on the measured intensity of the electric field, calculating field condition estimate, based on the TPC bit estimate and the field intensity estimate, and judging a condition of the electric field, based on the field condition estimate.

Japanese Patent Application Publication No. 2003-204299 has suggested a control system for controlling a velocity of a data signal transmitted to a mobile station through down-shared channel in a mobile packet communication system. The control system includes a first unit which receives transmission power control data of downward channel transmitted through upward channel, a second unit which stores therein the transmission power control data of downward channel, and a third unit which controls a velocity of a data signal transmitted to a mobile station through down-shared channel, in accordance with the transmission power control data of downward channel stored in the second unit.

Japanese Patent Application Publication No. 2004-88333 has suggested a transmission power controller including a first unit which judges whether received power is equal to or greater than a threshold, a second unit which judges whether transmission power control data included in received data indicates "increase" or "reduction", and a third unit. The second unit transmits the judgment as it is to the third unit, if the received power is equal to or greater than the threshold, or instructs the third unit to increase power, if the received power is smaller than the threshold, and further if the transmission power control data successively twice indicates "increase". The third unit increases or reduces power in accordance with the instruction received from the second unit.

SUMMARY OF THE INVENTION

In view of the above-mentioned problems in the prior art, it is an object of the present invention to avoid a mobile station in transmission power control from being influenced by a base station keeping transmitting TPC data to the mobile station to increase power by which the mobile station transmits a signal to the base station.

It is also an object of the present invention to reduce power consumption of a mobile station by avoiding the mobile station in transmission power control from being influenced by such a base station as mentioned above.

It is also an object of the present invention to avoid other base stations from being interfered with by avoiding a mobile station in transmission power control from being influenced by such a base station as mentioned above, thereby increasing a channel capacity of a wireless communication system, and enhancing communication quality.

It is also an object of the present invention to identify a base station keeping transmitting TPC data to a mobile station to increase power by which the mobile station transmits a signal to the base station, based on a history of TPC data received from the mobile station for controlling power by which a downward signal is transmitted to the mobile station.

Hereinbelow are described a mobile station in a CDMA wireless communication system, a method of controlling power for transmitting a CDMA wireless signal in a wireless communication system, an apparatus for controlling power for transmitting a wireless signal in a CDMA wireless communication system, and a program for causing a computer to carry out the above-mentioned method all in accordance with the present invention through the use of reference numerals used in later described embodiments. The reference numerals are indicated only for the purpose of clearly showing correspondence between claims and the embodiments. It should be noted that the reference numerals are not allowed to interpret claims of the present application.

In one aspect of the present invention, there is provided a mobile station in a CDMA wireless communication system, including a receiver (101-104) which receives power-control data by which power for transmitting a wireless signal is controlled, from a plurality of base stations during soft handover, a judging unit (106, 107) which judges tendency in accordance with which the power-control data varies, in accordance with predetermined standard, and a masking unit (105) which masks the power-control data, based on the results transmitted from the judging unit (106, 107).

For instance, the judging unit (106, 107) includes a first memory (107) which stores the received power-control data therein, and a first calculator (106) which carries out predetermined calculation based on the power-control data stored in the first memory (107), in which case, the judging unit (106, 107) judges the tendency in accordance with the calculation results of the first calculator (106).

It is preferable that the first calculator (106) calculates running mean of the power-control data stored in the first memory (107), over a predetermined section.

It is preferable that the first calculator (106) applies weighting to the calculation of the running mean.

The mobile station may further include a second memory (107) which stores therein power-control data by which power for transmitting a down-channel signal is controlled, and a second calculator (106) which carries out predetermined calculation based on the power-control data stored in the second memory, wherein the masking unit (105) masks the power-control data in accordance with predetermined standard, based on the results transmitted from the second calculator.

It is preferable that the second calculator (106) calculates running mean of the power-control data stored in the second memory (107), over a predetermined section.

It is preferable that the second calculator (106) applies weighting to calculation of the running mean.

It is preferable that the first and second memories (107) are comprised of a common single memory, and the first and second calculators (106) are comprised of a common single calculator.

There is further provided a mobile station in a CDMA wireless communication system, wherein if tendency in accordance with which power-control data by which power for transmitting a wireless signal is controlled varies in each of base stations during soft handover is identical with predetermined tendency, the power-control data transmitted from a base station or base stations exhibiting the tendency is not used for controlling power for transmitting a wireless signal.

There is further provided a mobile station in a CDMA wireless communication system, wherein a plurality of base stations for over which a mobile station moves in soft handover is grouped into a first group which meets predetermined requirements and a second group which does not meet predetermined requirements, and power-control data by which power for transmitting a wireless signal is controlled, transmitted from a base station or base stations belonging to the second group is not used for controlling power for transmitting a wireless signal.

There is further provided a mobile station in a CDMA wireless communication system, wherein among power-control data by which power for transmitting a wireless signal is controlled, transmitted from a base station or base stations, only power-control data meeting the predetermined requirements is used for controlling power for transmitting a wireless signal, during soft handover.

In another aspect of the present invention, there is provided an apparatus (108) for controlling power for transmitting a wireless signal in a CDMA wireless communication system, wherein power-control data by which power for transmitting a wireless signal is controlled, transmitted from a base station or base stations for soft handover, is grouped into a first group which meets predetermined requirements and a second group which does not meet the predetermined requirements, and power-control belonging to the second group is not used for controlling power for transmitting a wireless signal.

In still another aspect of the present invention, there is provided a method of controlling power for transmitting a wireless signal in a CDMA wireless communication system, including (a) receiving power-control data by which power for transmitting a wireless signal is controlled, from a plurality of base stations while a mobile station is in soft handover, (b) judging tendency in accordance with which the power-control data varies, in accordance with predetermined standard, and (c) controlling the power in accordance with the tendency.

For instance, the step (b) may include (b1) storing the received power-control data, and (b2) carrying out predetermined calculation based on the power-control data stored in the step (b1), wherein the tendency is judged in the step (b) in accordance with the calculation results of the step (b2).

It is preferable that running mean of the power-control data stored in the step (b1) is calculated in the step (b2).

It is preferable that weighting is applied to the calculation of the running mean.

In yet another aspect of the present invention, there is provided a computer readable medium encoded with program for causing a computer to carry out a method of controlling power for transmitting a wireless signal in a CDMA wireless communication system, steps executed by the computer in accordance with the program including (a) receiving power-control data by which power for transmitting a wireless signal is controlled, from a plurality of base stations while a mobile station is in soft handover, (b) judging tendency in accordance with which the power-control data varies, in accordance with predetermined standard, and (c) controlling the power in accordance with the tendency.

For instance, the step (b) may include (b1) storing the received power-control data, and (b2) carrying out predetermined calculation based on the power-control data stored in the step (b1), wherein the tendency is judged in the step (b) in accordance with the calculation results of the step (b2).

It is preferable that running mean of the power-control data stored in the step (b1) is calculated in the step (b2).

It is preferable that weighting is applied to the calculation of the running mean.

The advantages obtained by the aforementioned present invention will be described hereinbelow.

The present invention makes it possible to avoid a mobile station in transmission power control in a CDMA wireless communication system from being influenced by a base station keeping transmitting TPC data to the mobile station to increase power by which the mobile station transmits a signal to the base station.

The present invention makes it possible to reduce power consumption of a mobile station by avoiding the mobile station in transmission power control from being influenced by such a base station as mentioned above.

The present invention makes it possible to avoid other base stations from being interfered with, and enhance a channel capacity of a wireless communication system and communication quality by avoiding a mobile station in transmission power control from being influenced by such a base station as mentioned above, thereby increasing The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

In the embodiments explained hereinbelow, it is assumed that the present invention is applied to W-CDMA.

First Embodiment

Figure 1:
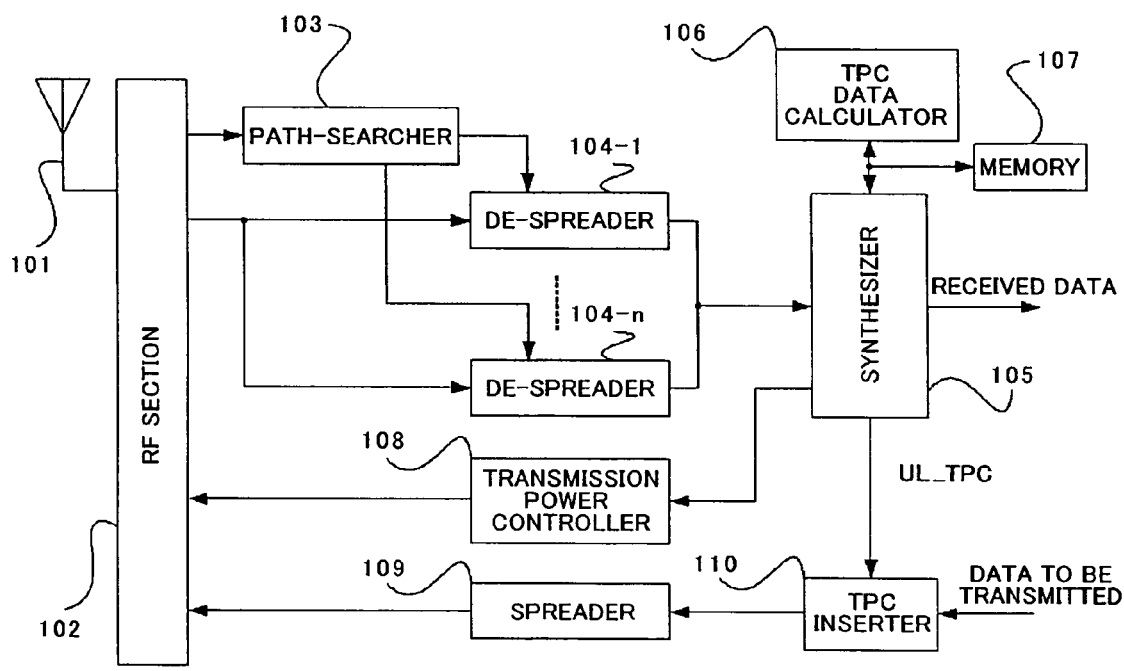
FIG. 1 is a block diagram of a signal-receiving circuit of a mobile station in a CDMA wireless communication system in accordance with the first embodiment of the present invention.

FIG. 1 is a block diagram of a signal-receiving circuit of a mobile station in a CDMA wireless communication system in accordance with the first embodiment of the present invention.

The illustrated signal-receiving circuit is comprised of an antenna 101, a radio-frequency (RF) section 102, a path-searcher 103, a plurality of de-spreaders 104-1 to 104-n, a synthesizer 105, a TPC data calculator 106, a memory 107, a transmission power controller 108, a spreader 109, and a TPC data inserter 110.

Signals are transmitted and received through the antenna 101.

The RF section 102 is comprised of an amplifier, an A/D converter, a D/A converter, and so on.

The path-searcher 103 finds a timing of each of paths in signals received from a base station.

Each of the de-spreaders 104-1 to 104-n de-spreads a signal with predetermined codes.

The synthesizer 105 synthesizes output signals transmitted from the de-spreaders 104-1 to 104-n for each of base stations.

The transmission power controller 108 controls an amplification degree of an amplifier (not illustrated) included in the RF section 102, in accordance with the synthesis results transmitted from the synthesizer 105.

The spreader 109 spreads a signal to be transmitted, with a predetermined code.

The TPC data inserter 110 inserts UL_TPC data synthesized in the synthesizer 105 into a signal to be transmitted. Herein, UL_TPC data indicates TPC data added to an upward signal, and is used for controlling power by which a downward signal is transmitted.

The synthesizer 105 applies soft-judgment to TPC data for each of base stations, and outputs them to the TPC data calculator 106. The TPC data calculator 106 sums up TPC data received from the synthesizer 105 for each of base stations.

The memory 107 stores various data therein. Data stored in the memory 107 is used in processes carried out by the synthesizer 105 and the TPC data calculator 106.

Though not illustrated, one of the synthesizer 105 and the TPC data calculator 106 is designed to include a central processing unit for controlling an operation of the signal-receiving circuit. The memory 107 further stores therein a program for operating the central processing unit. The central processing unit reads the program out of the memory 107, and executes the program. Thus, the central processing unit operates in accordance with the program stored in the memory 107.

Hereinbelow is explained an operation of the signal-receiving circuit illustrated in FIG. 1.

Signals transmitted from a plurality of base stations are received through the antenna 101, and then, are amplified and converted into a digital form in the RF section 102. A part of the digitized signals is input into the path-searcher 103. The path-searcher 103 extracts timing data out of the input digital signals, and transmits the timing data to the de-spreaders 104-1 to 104-n.

A part of the digitized signals is input directly into the de-spreaders 104-1 to 104-n. Each of the de-spreaders 104-1 to 104-n de-spreads the received digital signals. Specifically, each of the de-spreaders 104-1 to 104-n multiplies the received digital signals by a predetermined code in accordance with a timing indicated in the timing data received from the path-searcher 103. The thus de-spread signals are transmitted into the synthesizer 105.

The synthesizer 105 carries out synthesis of the signals and associated various steps.

The de-spread signals are synthesized with one another for each of base stations. For instance, if the signal-receiving circuit receives signals from a first base station through three paths, the synthesizer 105 synthesizes the threes paths with one another. If the signal-receiving circuit receives signals from a second base station through two paths, the synthesizer 105 synthesizes the two paths with each other. Hereinbelow, the thus synthesized TPC data for each of base stations is referred to as "synthesized TPC data".

The synthesizer 105 synthesizes a plurality of the synthesized TPC data with one another for each of base stations. Hereinbelow, the thus synthesized "synthesized TPC data" is referred to as "finally synthesized TPC data".

The synthesizer 105 synthesizes TPC data with other TPC data in accordance with soft-judgment. The finally synthesized TPC data is transmitted to the transmission power controller 108. The transmission power controller 108 controls power for transmitting signals to base stations, in accordance with soft-judgment results.

The synthesizer 105 stores the synthesized TPC data in the memory 107. Reading the synthesized TPC data out of the memory 107, the TPC data calculator 106 carries out calculation for judging whether a base station successively transmits TPC data to the mobile station to increase power by which the mobile station transmits a signal to the base station. The synthesizer 105 transmits the calculation results to the synthesizer 105 as mask data.

Herein, mask data means data indicative of a base station or base stations excluded in the calculation for further synthesizing the synthesized TPC data with another. The synthesized TPC data of a base station or base stations recorded in mask data as a base station or base stations to be masked is not used in the calculation of the finally synthesized TPC data. In contrast, the synthesized TPC data of a base station or base stations not recorded in mask data as a base station or base stations to be masked is used in the calculation of the finally synthesized TPC data.

The synthesizer 105 makes UL_TPC data based on an intensity of the received signals synthesized for each of stations. How to make UL_TPC data when there is a plurality of base stations is described in "3GPP TS 25.214 V3. 12. 0", pp. 21-27, for instance. The UL_TPC data made by the synthesizer 105 is transmitted to the TPC inserter 110.

The TPC inserter 110 inserts the received UL_TPC data into data to be transmitted. The data to which the UL_TPC data has been added is transmitted to the spreader 109.

The spreader 109 spreads the received data with predetermined pseudorandom noise (PN) codes, and then, transmits the thus spread data to the RF section 102.

The data is converted into an analogue form in the RF section 102, and amplified. Then, the data is transmitted through the antenna 101.

Figure 2:
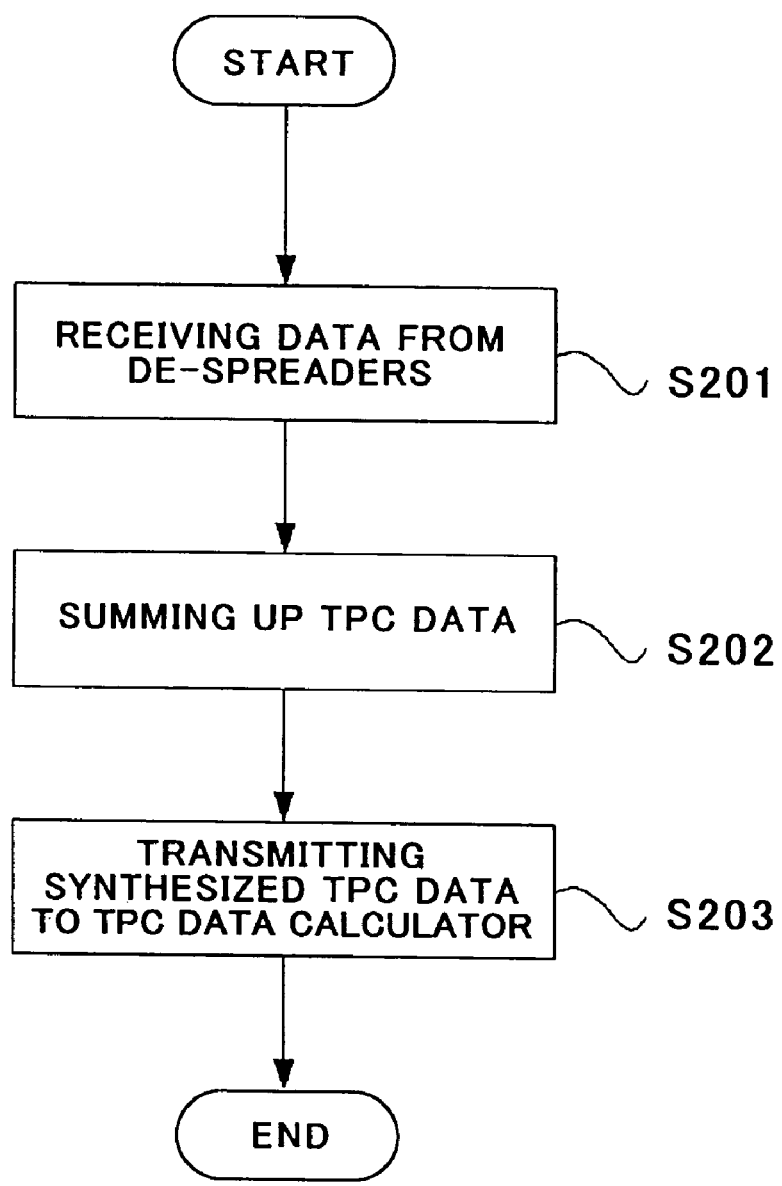
FIG. 2 is a flow chart showing steps to be carried out in power transmission control in accordance with the first embodiment of the present invention.

FIG. 2 is a flow chart showing steps to be carried out in the synthesizer 105.

Hereinbelow is explained how the synthesized TPC data is produced in the synthesizer 105, with reference to FIG. 2.

First, the synthesizer 105 receives data which were received from a base station through paths, from the de-spreaders 104-1 to 104-n, in step S201.

Then, the synthesizer 105 sums up TPC data having been extracted by the de-spreaders 104-1 to 104-n, for each of paths and further for each of base stations, in step S202. If a plurality of TPC data is received from a common base station through a plurality of paths, the plurality of TPC data is degenerated into single TPC data. As mentioned earlier, the thus degenerated TPC data is referred to as "synthesized TPC data".

Then, the synthesizer 105 transmits the synthesized TPC data to the TPC data calculator 106, in step S203. Specifically, the synthesizer 105 inputs the synthesized TPC data into the memory 107, and then, the TPC data calculator 106 reads the synthesized TPC data out of the memory 107. The TPC data calculator 106 processes the synthesized TPC data to calculate mask data.

Figure 3:
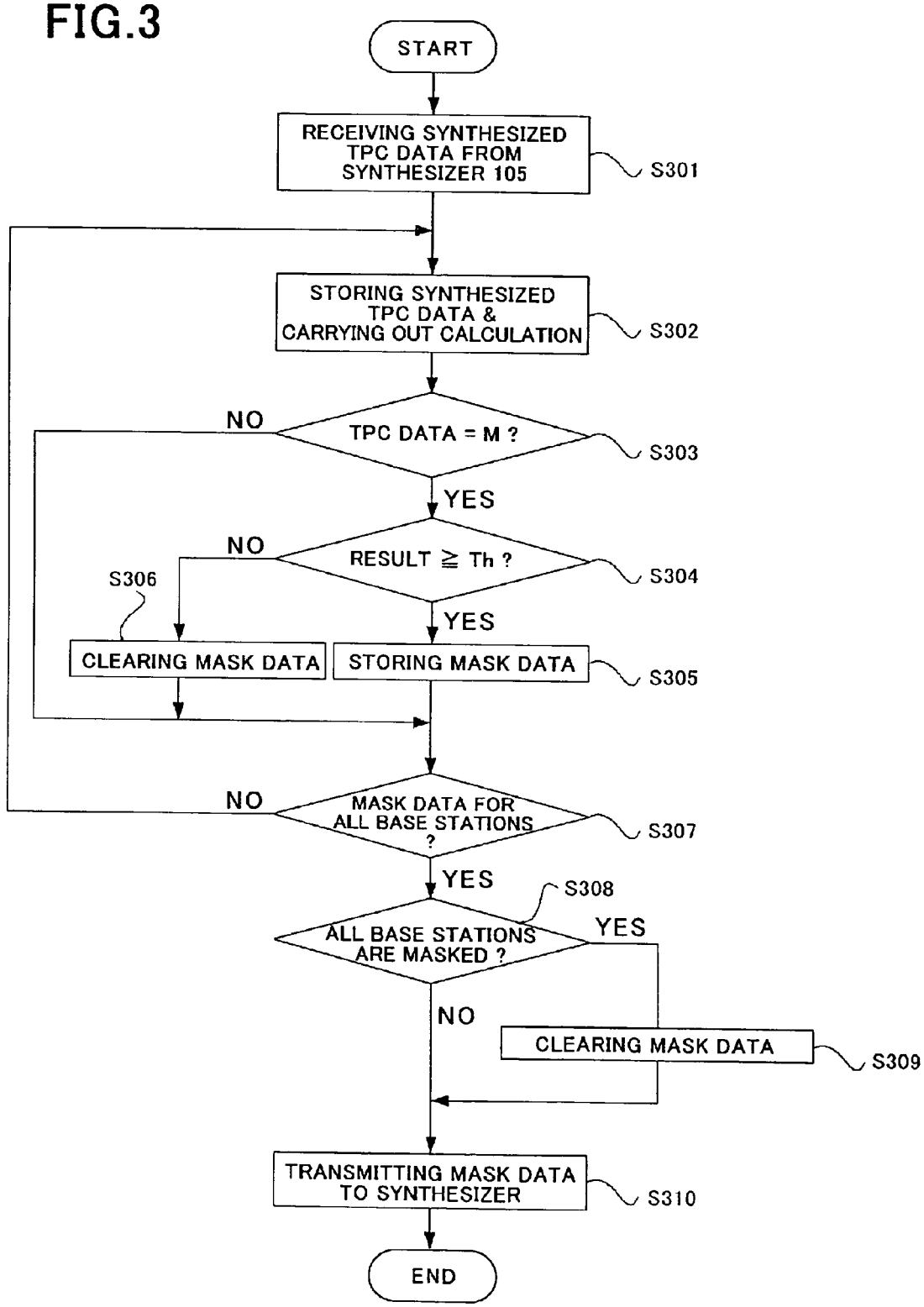
FIG. 3 is a flow chart showing steps to be carried out in power transmission control in accordance with the first embodiment of the present invention.

FIG. 3 is a flow chart showing steps to be carried out by the TPC data calculator 106.

Hereinbelow is explained an operation of the TPC data calculator 106 with reference to FIG. 3.

First, the TPC data calculator 106 receives the synthesized TPC data from the synthesizer 105, in step S301.

The TPC data calculator 106 stores the synthesized TPC data into the memory 107 for each of base stations, and carries out calculation for producing mask data, in step S302.

The calculation for producing mask data is explained hereinbelow.

On receipt of the synthesized TPC data from the synthesizer 105, the TPC data calculator 106 adds one (1) to the received synthesized TPC data, if the received synthesized TPC data includes an instruction to increase transmission power, or adds zero (0) to the received synthesized TPC data, if the received synthesized TPC data includes an instruction to reduce transmission power. Then, the TPC data calculator 106 carries out calculation in accordance with the following equation (A).

$$\mathrm{ADD\_}TPC(n)=[TPC(n)+TPC(n-1)+\ldots+TPC(n-M)]/M \quad (A)$$

In the equation (A), ADD_TPC(n) indicates n-th running mean. TPC(n) indicates n-th received synthesized TPC data, in which an instruction to increase transmission power is expressed as one (1), and an instruction to reduce transmission power is expressed as zero (0). "M" indicates an average period of time in which running mean is calculated. If the synthesized TPC data stored in the memory 107 exceeds M, the oldest TPC data is removed. That is, TPC(n−M) is first removed, and next, TPC(n−M+1) is removed.

By carrying out calculation in accordance with the equation (A), tendency in accordance with which TPC data received from a base station varies is found.

For instance, assuming that M=10 and a threshold Th=7/10, if eight or more TPC data out of latest 10 TPC data include an instruction to increase transmission power, ADD_TPC(n) would be equal to or greater than the threshold Th (ADD TPC(n)≧Th). Thus, it is understood that a frequency for TPC data to include an instruction t6 increase transmission power is high.

In contrast, if ADD_TPC(n) is equal to or smaller than the threshold Th (ADD_TPC(n)≦Th), a frequency for TPC data to include an instruction to increase transmission power is low. That is, TPC data includes in average an instruction to increase transmission power and an instruction to reduce transmission power.

Then, it is judged whether the synthesized TPC data associated with the average period of time indicated with "M" is stored, that is, whether a number of the synthesized TPC data stored in the memory 107 is equal to M, in step S303.

If it is judged that the M synthesized TPC data is stored in the memory 107 during the average period of time (YES in step S303), it is judged whether the calculation result is equal to or greater than the threshold Th, in step S304.

If the calculation result is equal to or greater than the threshold Th (YES in step S304), mask data indicating that a base station or base stations exceeding the threshold Th is(are) masked is stored in the memory 107, in step 305.

If it is not judged that the M synthesized TPC data is stored in the memory 107 during the average period of time (NO in step S303), step S307 is carried out.

If the calculation result is smaller than the threshold Th (NO in step S304), the mask data is cleared, in step S306. Then, step S307 is carried out.

In step S307, it is judges whether the calculation is carried out to produce mask data for all of base stations transmitting signals to the mobile station.

If not (NO in step S307), steps S302 to S306 are repeatedly carried out for a base station or base stations for which the calculation is not carried out to produce mask data.

If the calculation is carried out to produce mask data for all of base stations transmitting signals to the mobile station (YES in step S307), it is judged whether the mask data indicates that the synthesized TPC data received from all of base stations transmitting a signal to the mobile station is masked, in step S308.

If it is judged that the mask data indicates that the synthesized TPC data received from all of base stations transmitting a signal to the mobile station is masked (YES in step S308), the mask data is cleared, in step S309. That is, the mask data is rewritten into data indicating that the synthesized TPC data received from all base stations is not masked. This is because, if the synthesized TPC data received from all base stations is masked, it would be impossible to control transmission power.

Then, the mask data is transmitted to the synthesizer 105, in step S310.

If it is not judged that the mask data indicates that the synthesized TPC data received from all of base stations transmitting a signal to the mobile station is masked (NO in step S308), the mask data is transmitted to the synthesizer 105, in step S310. Specifically, the mask data is stored into the memory 107, and the synthesizer 105 reads the mask data out of the memory 107.

Figure 4:
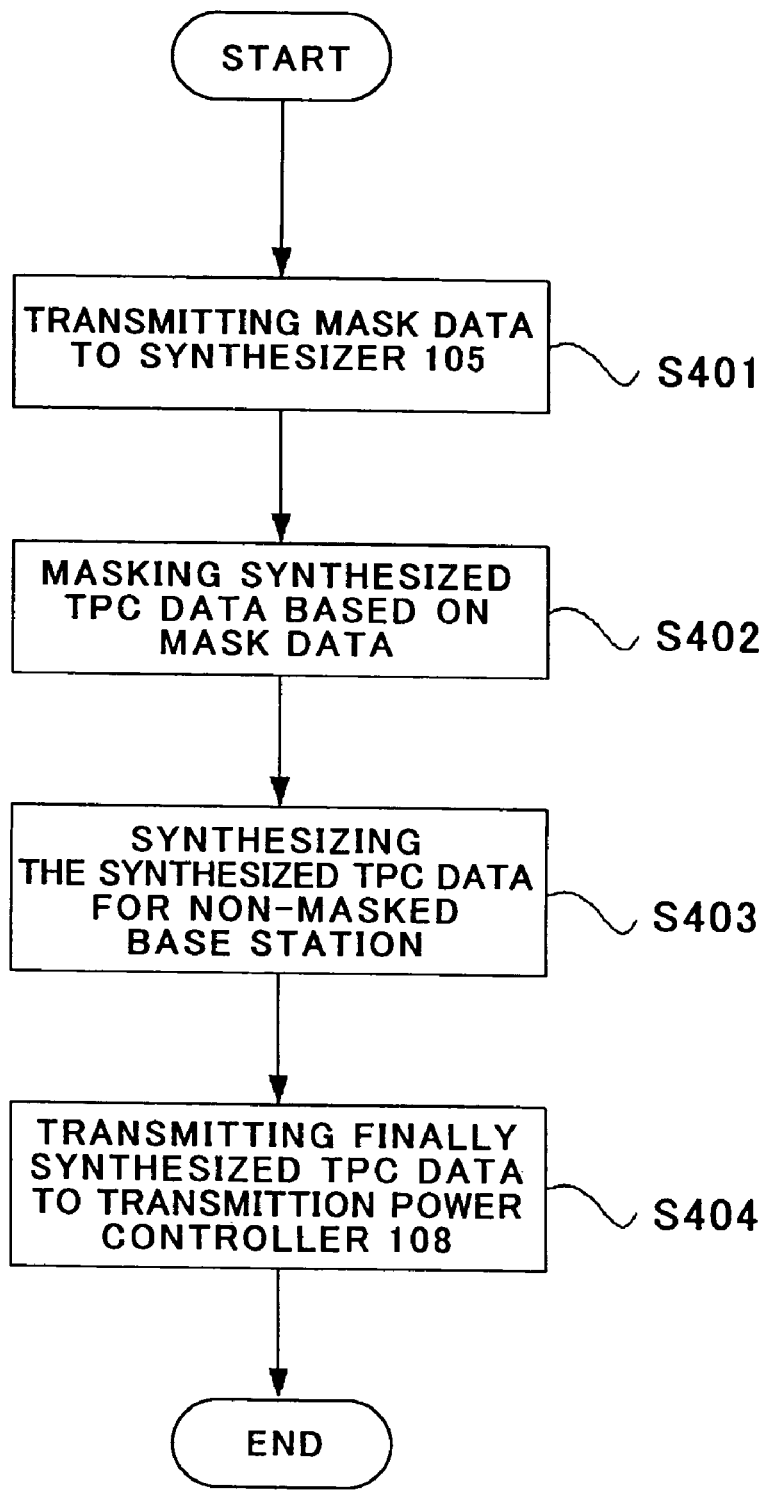
FIG. 4 is a flow chart showing steps to be carried out in power transmission control in accordance with the first embodiment of the present invention.

FIG. 4 is a flow chart showing steps to be carried out by the TPC data calculator 106 after the steps shown in FIG. 3 have been carried out.

Hereinbelow is explained a subsequent operation of the TPC data calculator 106.

The mask data is thereafter transmitted to the synthesizer 105 from the TPC data calculator 106, in step S401.

The synthesizer 105 masks the synthesized TPC data for each of base stations in accordance with the received mask data, in step S402.

The synthesize 105 does not mask the synthesized TPC data associated with a base station or base stations which is(are) not indicated to be masked. If a certain base station or certain base stations has(have) been already indicated as a base station or base station to be masked, the certain base station or certain base stations are cleared from being masked.

Then, the synthesizer 105 further synthesizes the synthesized TPC data for each of base stations not masked, in step S403.

As mentioned earlier, the finally synthesized TPC data can be obtained in accordance with Algorithm I or Algorithm II defined in the standard specification. For instance, the finally synthesized TPC data may be obtained in accordance with a process in which there is used only TPC data received from a base station which transmits a signal with most intensive power among base stations, or a process in which a plurality of TPC data having been weighted in proportion to power by which a signal is transmitted is binary-judged.

Then, the synthesizer 105 transmits the finally synthesized TPC data to the transmission power controller 108, in step S404.

The signal-receiving circuit of a mobile station in accordance with the first embodiment makes it possible to avoid a mobile station in transmission power control from being influenced by a base station keeping transmitting TPC data to the mobile station to increase power by which the mobile station transmits a signal to the base station.

Second Embodiment

The second embodiment is different from the first embodiment only in that weighting is applied to the calculation of running means.

The equation (B) is used in the second embodiment.

$$ADD\_TPC(n)=[\alpha(n){\times}TPC(n)+\alpha(n-1){\times}TPC(n-1)+\ldots+\alpha(n-M){\times}TPC(n-M)]/M \quad (B)$$

In the equation (B), ADD_TPC(n) indicates n-th weighted running mean. TPC(n) indicates n-th received synthesized TPC data, in which an instruction to increase transmission power is expressed as one (1), and an instruction to reduce transmission power is expressed as zero (0). "M" indicates an average period of time in which running mean is calculated. If the synthesized TPC data stored in the memory 107 exceeds M, the oldest TPC data is removed. That is, TPC(n−M) is first removed, and next, TPC(n−M+1) is removed.

In the equation (B), "α" indicates a weighting coefficient, and it is preferable that the weighting coefficient "α" meets the following requirements.

$$0 \leq \alpha(n) \leq 1 \text{ and } \alpha(n-M) \leq \ldots \leq \alpha(n-2) \leq \alpha(n-1) \leq \alpha(n)$$

The greater weighting coefficient "α" is applied to newer synthesized TPC data. Consequently, running mean contributes to enhancement in reliability of the synthesized TPC data.

The second embodiment is particularly preferable to a case in which a mobile station is moving. While a mobile station is moving, a condition for wireless signals to spread varies every moment, and an influence caused by phasing also varies. Hence, older synthesized TPC data (namely, remoter from "n") is more difficult to reflect current signal-spreading condition. That is, newer synthesized TPC data (namely, closer to "n") more clearly reflects current signal-spreading condition.

Hence, it is possible to enhance quality in transmission power control by calculating running mean with a weighting coefficient "α" being applied to the synthesized TPC data.

Third Embodiment

The third embodiment is different from the first and second embodiments only with respect to an operation of the synthesizer 105.

Figure 5:
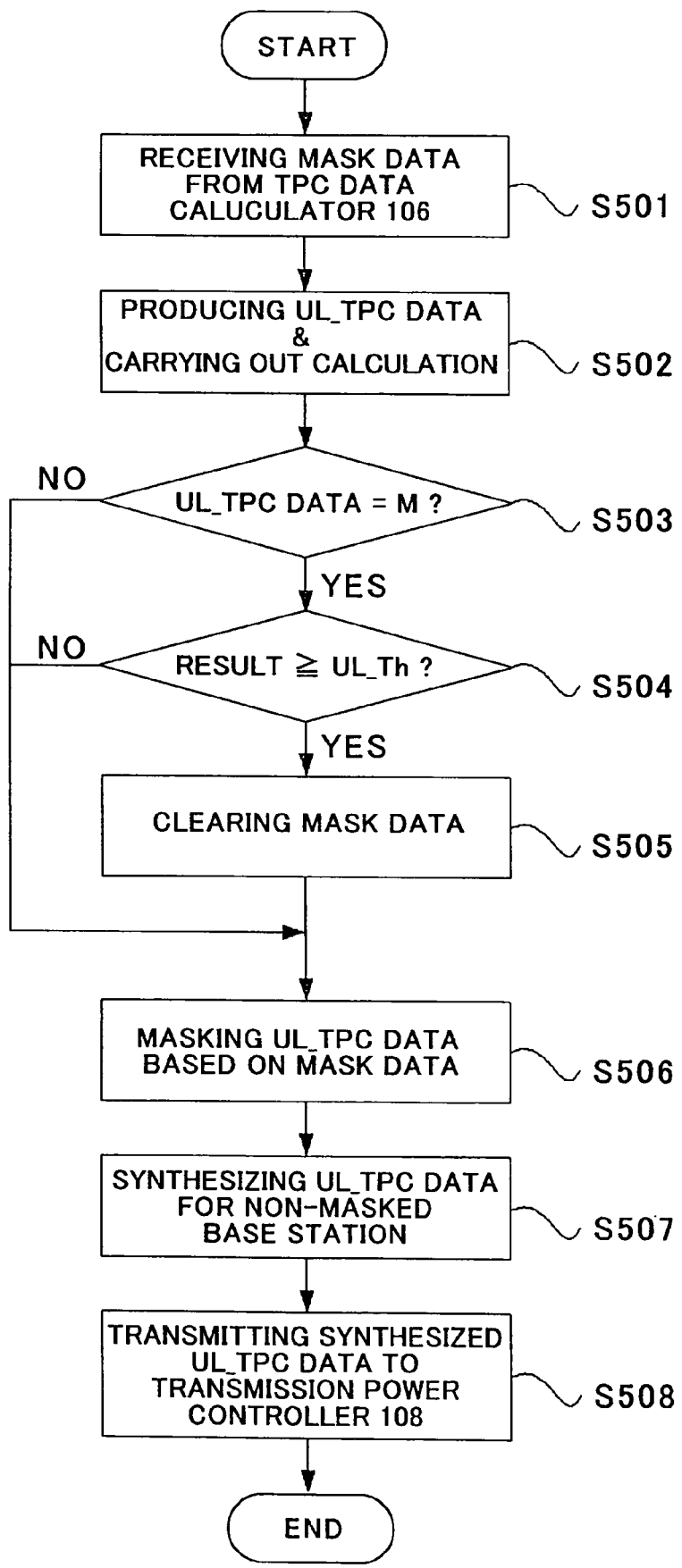
FIG. 5 is a flow chart showing steps to be carried out in power transmission control in accordance with the third embodiment of the present invention.

FIG. 5 is a flow chart showing steps to be carried out by the synthesizer 105 in the third embodiment.

Hereinbelow is explained an operation of the synthesizer 105 in the third embodiment.

In the third embodiment, UL_TPC data transmitted from a mobile station is used for calculation of mask data unlike the first embodiment. Specifically, steps S501 to S505 are carried out unlike the first embodiment.

The synthesizer 105 receives mask data from the TPC data calculator 106, in step S501.

Then, the synthesize 105 produces UL_TPC data to be transmitted to a base station, and carries out calculation, in step S502.

Hereinbelow is explained the calculation to be carried out in step S502.

On receipt of UL_TPC data from the synthesizer 105, the TPC data calculator 106 adds one (1) to the UL_TPC data, if the UL_TPC data includes an instruction to increase power, and adds zero (0) to the UL_TPC data, if the UL_TPC data includes an instruction to reduce power. Then, the TPC data calculator 106 carries out calculation in accordance with the equation (C).

$$UL\_ADD\_TPC(n)=[UL\_TPC(n)+UL\_TPC(n-1)+ \ldots +UL\_TPC(n-M)]/M \quad (C)$$

In the equation (C), UL_ADD_TPC(n) indicates n-th running mean. UL_TPC(n) indicates n-th received synthesized UL_TPC data, in which an instruction to increase transmission power is expressed as one (1), and an instruction to reduce transmission power is expressed as zero (0). "M" indicates an average period of time in which running mean is calculated. If UL_TPC data stored in the memory 107 exceeds M, the oldest UL_TPC data is removed. That is, UL_TPC(n−M) is first removed, and next, UL_TPC(n−M+1) is removed.

Then, it is judged whether the UL_TPC data associated with the average period of time indicated with "M" is stored, that is, whether a number of the UL_TPC data stored in the memory 107 is equal to M, in step S503.

If it is judged that the M s UL_TPC data is stored in the memory 107 during the average period of time (YES in step S503), it is judged whether the calculation result is equal to or greater than a threshold UL_Th, in step S504.

If the calculation result is equal to or greater than the threshold UL_Th (YES in step S504), mask data is cleared, in step 505.

If it is not judged that the M UL_TPC data is stored in the memory 107 during the average period of time (NO in step S503) or if the calculation result is smaller than the threshold UL_Th (NO in step S504), steps S506, S507 and S508 are carried out in the same way as the steps S402, S403 and S404 shown in FIG. 4.

The fact that running means of UL_TPC data is equal to or greater than the threshold UL_Th means that a signal transmitted from a base station is weak in intensity, because UL_TPC data is dependent on power of the base station. Thus, even if TPC data includes an instruction to increase power, the TPC data may be caused by natural reasons such as deterioration in wireless signal environment. That is, there is high possibility that the TPC data does not include an instruction to increase power.

Hence, it is preferable that the mask data is cleared in order to carry out optimal transmission power control.

Fourth Embodiment

The fourth embodiment is different from the third embodiment only in that weighting is applied to the calculation of running means.

The equation (D) is used in the fourth embodiment.

$$UL\_ADD\_TPC(n)=[\alpha(n) \times UL\_TPC(n)+\alpha(n-1) \times UL\_TPC(n-1)+ \ldots +\alpha(n-M) \times UL\_TPC(n-M)]/M \quad (D)$$

In the equation (D), UL_ADD_TPC(n) indicates n-th weighted running mean. UL_TPC(n) indicates n-th received UL_TPC data, in which an instruction to increase transmission power is expressed as one (1), and an instruction to reduce transmission power is expressed as zero (0). "M" indicates an average period of time in which running mean is calculated. If the UL_TPC data stored in the memory 107 exceeds M, the oldest UL_TPC data is removed. That is, UL_TPC(n−M) is first removed, and next, UL_TPC(n−M+1) is removed.

In the equation (D), "α" indicates a weighting coefficient, and it is preferable that the weighting coefficient "α" meets the following requirements.

$$0 \leq \alpha(n) \leq 1 \text{ and } \alpha(n-M) \leq \ldots \leq \alpha(n-2) \leq \alpha(n-1) \leq \alpha(n)$$

The greater weighting coefficient "α" is applied to newer UL_TPC data. Consequently, running mean contributes to enhancement in reliability of the UL_TPC data.

The fourth embodiment is particularly preferable to a case in which a mobile station is moving. While a mobile station is moving, a condition for wireless signals to spread varies every moment, and an influence caused by phasing also varies. Hence, older UL_TPC data (namely, remoter from "n") is more difficult to reflect current signal-spreading condition. That is, newer UL_TPC data (namely, closer to "n") more clearly reflects current signal-spreading condition.

Hence, it is possible to enhance quality in transmission power control by calculating running mean with a weighting coefficient "α" being applied to the UL_TPC data.

Fifth Embodiment

In each of the above-mentioned first to fourth embodiments, the period of time M used in calculation of ADD_TPC(n) may be different from the period of time M used in calculation of UL_ADD_TPC(n).

In each of the above-mentioned first to fourth embodiments, the period of time M used in calculation of ADD_TPC(n) and UL_ADD_TPC(n) may be varied in accordance with a condition of a mobile station.

For instance, when a mobile station is spatially moving, wireless signal environment varies every moment. Hence, the period of time M may be made smaller, because the period of time M is slightly influenced by old TPC(n) and UL_TPC(n). In contrast, when a mobile station is not spatially moving, the period of time M may be made greater for the same reason.

The period of time M may be varied dynamically or statically.

In each of the above-mentioned first to fourth embodiments, the thresholds Th and UL_Th may be varied in accordance with wireless signal environment of a mobile station.

For instance, the thresholds Th and UL_Th may be made smaller in bad wireless signal environment in order to reduce influence caused by the bad wireless signal environment.

The thresholds Th and UL_Th may be expressed with a function in which wireless signal environment is used as a parameter, in which case, the thresholds Th and UL_Th are varied in accordance with wireless signal environment. As a parameter indicating wireless signal environment, there may be used SIR of pilot channel.

The thresholds Th and UL_Th may be varied dynamically or statically, but it is necessary to meet the requirements $0 \leq Th$ and $UL\_TH \leq 1$.

In each of the above-mentioned first to fourth embodiments, an instruction to increase transmission power is expressed as one (1), and an instruction to reduce transmission power is expressed as zero (0) in the calculation of ADD_TPC(n) and UL_ADD_TPC(n). To the contrary, an instruction to increase transmission power may be expressed as zero (0), and an instruction to reduce transmission power may be expressed as one (1), in which case, however, the thresholds Th and UL_Th may be varied accordingly.

In the signal-receiving circuit illustrated in FIG. 1, the synthesizer 105 and the TPC data calculator 106 are formed as separate circuits. However, they may be formed as a common circuit. For instance, they may be constructed in the form of a software or program by means of a common processor.

In the signal-receiving circuit illustrated in FIG. 1, the memory 107 are electrically connected to both the synthesizer 105 and the TPC data calculator 106. However, the memory 107 may be prepared separately from the signal-receiving circuit. For instance, the memory 107 may be electrically connected only to the synthesizer 105 or only to the TPC data calculator 106. As an alternative, each of the synthesizer 105 and the TPC data calculator 106 may be designed to include the memory 107.

In each of the above-mentioned first to fourth embodiments, ADD_TPC(n) was calculated using running mean. However, ADD_TPC(n) may be obtained in other ways. For instance, ADD_TPC(n) may be obtained by applying digital filtration to TPC data. A low-pass filter is an example of the digital filtration. It is possible to extract only information indicating whether there is TPC data including an instruction to increase transmission power.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2004-379119 filed on Dec. 28, 2004 including specification, claims, drawings and summary is incorporated herein by reference in its entirety.

What is claimed is:

1. A mobile station in a CDMA wireless communication system, comprising:
   a receiver which receives power-control data by which power for transmitting a wireless signal is controlled, from a plurality of base stations during soft handover;
   a judging unit which judges a trend in accordance with which said power-control data varies by calculating a running mean of said power-control data over a predetermined section and determining whether the calculated running mean is equal to or greater than a threshold; and
   a masking unit which masks said power-control data, based on the results transmitted from said judging unit,
   wherein masking said power-control data indicates a base station excluded in calculation of finally synthesized power-control data which corresponds to a resultant of a plurality of synthesized power-control data of each base station of the plurality of base stations synthesized with one another.

2. The mobile station as set forth in claim 1, wherein said judging unit includes:
   a first memory which stores the received power-control data therein; and
   a first calculator which carries out predetermined calculation based on said power-control data stored in said first memory,
   said judging unit judging said tendency in accordance wit the calculation results of said first calculator.

3. The mobile station as set forth in claim 2, wherein said first calculator calculates the running mean of said power-control data stored in said first memory.

4. The mobile station as set forth in claim 3, wherein said first calculator applies weighting to the calculation of said running mean.

5. The mobile station as set forth in claim 3, wherein if the running mean of said power control data is equal to or greater than a threshold, the masking unit masks said power-control data.

6. The mobile station as set forth in claim 3, wherein if the running mean of said power control data is less than a threshold, mask data is cleared for said power-control data.

7. The mobile station as set forth in claim 1, further comprising:
   a second memory which stores therein power-control data by which power for transmitting a down-channel signal is controlled; and
   a second calculator which carries out predetermined calculation based on said power control data stored in said second memory,
   wherein said masking unit masks said power-control data, based on the results transmitted from said second calculator.

8. The mobile station as set forth in claim 7, wherein said second calculator calculates the running mean of said power-control data stored in said second memory.

9. The mobile station as set forth in claim 8, wherein said second calculator applies weighting to calculation of said running mean.

10. The mobile station as set forth in claim 7, wherein said first and second memories are comprised of a common single memory, and said first and second calculators are comprised of a common single calculator.

11. The mobile station as set forth in claim 1, wherein the tendency in accordance with which said power-control data varies is a frequency for said power-control data to include an instruction to increase transmission power is high or a frequency for said power-control data to include an instruction to increase transmission power is low.

12. A mobile station in a CDMA wireless communication system, comprising:
   a judging unit which judges if a trend in accordance with which power-control data varies in each of a plurality of base stations during soft handover is identical to a predetermined trend by calculating a running mean of said power-control data over a predetermined section and determining whether the calculated running mean is equal to or greater than a threshold, wherein said power-control data transmitted from a base station among said plurality of base stations exhibiting said trend is not used for controlling power for transmitting a wireless signal.

13. A mobile station in a CDMA wireless communication system, comprising:
a judging unit which groups a plurality of base stations over which a mobile station moves in soft handover, by calculating a running mean of said power-control data over a predetermined section and determining whether the calculated running mean is equal to or greater than a threshold, into a first group which satisfies a predetermined requirement and a second group which does not satisfy the predetermined requirement, wherein power-control data by which power for transmitting a wireless signal is controlled, transmitted from a base station belonging to said second group is not used for controlling power for transmitting a wireless signal.

14. A mobile station in a CDMA wireless communication system, comprising:
a judging unit which judges among power-control data by which power for transmitting a wireless signal is controlled, transmitted from a plurality of base stations, only power-control data satisfying a predetermined requirement is used for controlling power for transmitting a wireless signal, during soft handover, by calculating a running mean of said power-control data over a predetermined section and determining whether the calculated running mean is equal to or greater than a threshold.

15. An apparatus for controlling power for transmitting a wireless signal in a CDMA wireless communication system, comprising:
a judging unit which groups power-control data by which power for transmitting a wireless signal is controlled, transmitted from a plurality of base stations for soft handover, by calculating a running mean of said power-control data over a predetermined section and determining whether the calculated running mean is equal to or greater than a threshold, into a first group which satisfies a predetermined requirement and a second group which does not satisfy said predetermined requirement, and power-control belonging to said second group is not used for controlling power for transmitting a wireless signal.

16. A method of controlling power for transmitting a wireless signal in a CDMA wireless communication system, the method comprising:
(a) receiving power-control data by which power for transmitting a wireless signal is controlled, from a plurality of base stations while a mobile station is in soft handover;
(b) judging a trend in accordance with which said power-control data varies by calculating a running mean over a predetermined section and determining whether the calculated running mean is equal to or greater than a threshold; and
(c) controlling said power for transmitting the wireless signal by masking said power-control data, based on the results transmitted from said judging unit,
wherein masking said power-control data indicates a base station excluded in calculation of finally synthesized power-contort data which corresponds to a resultant of a plurality of synthesized power-control data of each base station of the plurality of base stations synthesized with one another.

17. The method as set forth in claim 16, wherein said step (b) includes:
(b1) storing the received power-control data; and
(b2) carrying out predetermined calculation based on said power-control data stored in said step (b1),
wherein said tendency is judged in said step (b) in accordance with the calculation results of said step (b2).

18. The method as set forth in claim 17, wherein running mean of said power-control data stored in said step (b1) is calculated in said step (b2).

19. The method as set forth in claim 18, wherein weighting is applied to the calculation of said running mean.

20. A computer readable medium encoded with program for causing a computer to carry out a method of controlling power for transmitting a wireless signal in a CDMA wireless communication system, the method comprising:
(a) receiving power-control data by which power for transmitting a wireless signal is controlled, from a plurality of base stations while a mobile station is in soft handover;
(b) judging a trend in accordance with which said power-control data varies by calculating a running mean over a predetermined section and determining whether the calculated running mean is equal to or greater than a threshold; and
(c) controlling said power for transmitting the wireless signal by masking said power-control data, based on the results transmitted from said judging unit.
wherein masking said power-control data indicates a base station excluded in calculation of finally synthesized Dower-control data which corresponds to a resultant of a plurality of synthesized power-control data of each base station of the plurality of base stations synthesized with one another.

21. The program as set forth in claim 20, wherein said step (b) includes:
(b1) storing the received power-control data; and
(b2) carrying out predetermined calculation based on said power-control data stored in said step (b1),
wherein said tendency is judged in said step (b) in accordance with the calculation results of said step (b2).

22. The program as set forth in claim 21, wherein running mean of said power-control data stored in said step (b1) is calculated in said step (b2).

23. The program as set forth in claim 22, wherein weighting is applied to the calculation of said running mean.

24. A mobile station in a CDMA wireless communication system, comprising:
a receiver which receives power-control data by which power for transmitting a wireless signal is controlled, from a plurality of base stations during soft handover;
a judging unit which judges tendency in accordance with which said power-control data varies: and
a masking unit which masks said power-control data, based on the results transmitted from said judging unit
wherein said judging unit includes:
a first memory which stores the received power-control data therein; and
a first calculator which carries out predetermined calculation based on said power-control data stored in said first memory,
said judging unit judging said tendency in accordance with the calculation results of said first calculator: and
wherein said first calculator calculates running mean of said power-control data stored in said first memory, over a predetermined section, and
wherein masking said power-control data is used to indicate a base station excluded in calculation of finally synthesized power-control data which corresponds to a resultant of a plurality of synthesized power-control data of each base station of the plurality of base stations synthesized with one another.

25. A mobile station in a CDMA wireless communication system, comprising:
- a receiver which receives power-control data by which power for transmitting a wireless signal is controlled, from a plurality of base stations during soft handover;
- a judging unit which judges tendency in accordance with which said power-control data varies; and
- a masking unit which masks said power-control data, based on the results transmitted from said judging unit, wherein said judging unit includes:
- a first memory which stores the received power-control data therein; and
- a first calculator which carries out predetermined calculation based on said power-control data stored in said first memory, said judging unit judging said tendency in accordance with the calculation results of said first calculator; and wherein said first calculator calculates running mean of said power-control data stored in said first memory, over a predetermined section, and wherein if the running mean of said power control data is less than a threshold, mask data is cleared for said power-control data.

* * * * *